United States Patent
Huang et al.

(10) Patent No.: US 7,274,177 B2
(45) Date of Patent: Sep. 25, 2007

(54) OVERSHOOT SUPPRESSION CIRCUIT FOR A VOLTAGE REGULATION MODULE

(75) Inventors: Jian-Rong Huang, Hsinchu (TW); Liang-Pin Tai, Tainan (TW); Peng-Ju Lan, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/180,662

(22) Filed: Jul. 14, 2005

(65) Prior Publication Data

US 2006/0012346 A1    Jan. 19, 2006

(30) Foreign Application Priority Data

Jul. 19, 2004    (TW) .............................. 93121543 A

(51) Int. Cl.
G05F 1/573    (2006.01)
G05F 1/569    (2006.01)
(52) U.S. Cl. .................... 323/277; 323/276; 323/286; 323/288
(58) Field of Classification Search ................ 323/222, 323/286, 288, 277, 276, 274
See application file for complete search history.

(56) References Cited

U.S. PATENT DOCUMENTS

| 5,864,227 | A | * | 1/1999 | Borden et al. | ............... 323/280 |
| 5,939,867 | A | * | 8/1999 | Capici et al. | ............... 323/277 |
| 6,201,375 | B1 | * | 3/2001 | Larson et al. | ............... 323/277 |
| 6,377,033 | B2 | * | 4/2002 | Hsu | ........................... 323/274 |
| 6,388,433 | B2 | * | 5/2002 | Marty | ........................ 323/284 |
| 6,703,812 | B1 | * | 3/2004 | Lethellier | ................... 323/222 |
| 6,710,643 | B1 | * | 3/2004 | Rajeevakumar | ............. 327/540 |
| 6,853,170 | B2 | * | 2/2005 | Miyazaki | ..................... 323/282 |
| 6,871,289 | B2 | * | 3/2005 | Pullen et al. | ............... 713/300 |
| 7,002,330 | B2 | * | 2/2006 | Kitani et al. | ................. 323/284 |
| 7,049,799 | B2 | * | 5/2006 | Sugiura | ...................... 323/282 |
| 7,049,879 | B2 | * | 5/2006 | Osamura et al. | ............ 327/419 |

* cited by examiner

*Primary Examiner*—Bao Q. Vu
(74) *Attorney, Agent, or Firm*—Rosenberg, Klein & Lee

(57) ABSTRACT

An overshoot suppression circuit comprises a switch for coupling to an output of a voltage regulation module and a voltage detector for detecting an output voltage at the output. When the load to the voltage regulation module changes from heavy to light to result in the output voltage higher than a threshold, the voltage detector turns on the switch to release energy from the output, and thereby the output voltage is suppressed to produce overshoot to damage the load coupled to the output.

8 Claims, 8 Drawing Sheets

OVERSHOOT SUPPRESSION CIRCUIT FOR A VOLTAGE REGULATION MODULE

FIELD OF THE INVENTION

The present invention is related generally to a voltage regulation module (VRM) and more particularly to an overshoot suppression circuit for a VRM.

BACKGROUND OF THE INVENTION

Recently, VRM has been applied in various electronic products, especially portable devices, to provide a stable supply voltage. It is a stringent challenge on the VRM transient. For example, Intel's road map shows that the VRM for a central processing unit (CPU) needs very tight regulation. Active voltage position (AVP) technique is widely used in pulse width modulation (PWM) converters, and active droop control is a popular way to achieve adaptive voltage position for a VRM. However, the output voltage of a VRM will overshoot as loading release and may damage the system thereby. One way to improve this overshoot is to increase the output capacitors coupled to the output of the VRM or reduce the equivalent series resistance (ESR) Rc of the output capacitors Co. Unfortunately, increasing the capacitor number will increase the size and cost of a VRM. In the VRM system, buck PWM is a popular system. FIG. 1 shows a typical buck PWM output stage of a VRM 100 and for simplification, the other portion of the VRM 100 is not shown. In the VRM 100, signals U and L are used through drivers 106 and 108 to switch a pair of switches 102 and 104 coupled between an input voltage Vin and ground GND to thereby produce an inductor current IL flowing through an inductor L to charge an output capacitor Co to further produce an output voltage Vout to supply for a load 109. FIG. 2 shows an ideal loading release in VRM condition and real output voltage Vout of the VRM 100 in a load transient. In FIG. 2, waveform 110 represents the inductor current IL, waveform 112 represents the output voltage Vout of the VRM 100 without using AVP technique, waveform 114 represents the output voltage Vout of the VRM 100 in an ideal loading release, and waveform 116 represents the output voltage Vout of the VRM 100 using active droop control. When the load 109 to the VRM 100 changes from light to heavy at time T1, the inductor current IL instantly increases to a higher level as shown in the waveform 110, and the output voltage Vout of the VRM 100 will drop down rapidly and then recover to the original level gradually, as shown in the waveform 112. Until the load 109 changes from heavy to light at time T2, the inductor current IL instantly decreases back to the original level as shown in the waveform 110, and as shown in the waveform 112, if no AVP technique is used, the output voltage Vout increases instantly and then recovers to the original level gradually. In the load transient, the spike $\Delta V$ of the output voltage Vout may be so large to damage the load 109.

To reduce the spike $\Delta V$ of the output voltage Vout resulted from a load transient, an AVP technique is employed, by which the output voltage Vout is maintained at the lower level when the load 109 to the VRM 100 changes from light to heavy at time T1, as shown in the waveform 114, until time T2 to recover to the original level when the load 109 changes from heavy back to light. As shown in the waveform 114, the spike $\Delta V'$ of the output voltage Vout is almost half of the spike $\Delta V$ in the waveform 112. However, the waveforms 114 is only present under an ideal condition, which means that the output capacitor Co is large enough to absorb the energy released from the inductor L as loading release. In this case, the output voltage Vout will not overshoot and will not damage the system thereby. On the contrary, in most real cases, there will not be very large output capacitor Co in a system, especially in a handheld product, such as notebook computer and personal digital assistant (PDA). If the output capacitor Co is not large enough, the inductor energy cannot be absorbed instaneously as loading release, and the output voltage Vout will overshoot as shown in the waveform 116, which may damage the load 109.

Therefore, it is desired an overshoot suppression circuit for a VRM.

SUMMARY OF THE INVENTION

One object of the present invention is to provide an overshoot suppression circuit for a VRM.

According to a first embodiment of the present invention, an overshoot suppression circuit for a VRM comprises a switch coupled to an output of the VRM and a voltage detector for detecting an output voltage at the output. In a load transient, the voltage detector turns on the switch to release energy from the output when the output voltage is higher than a threshold, and thereby the output voltage will not overshoot to damage the load coupled to the output.

According to a second embodiment of the present invention, an overshoot suppression circuit for a VRM comprises a switch coupled between an energy storage element and an output of the VRM, and a voltage detector for detecting an output voltage at the output. In a load transient, the voltage detector turns on the switch to inject energy from the output to the energy storage element when the output voltage is higher than a threshold, and thereby the output voltage will not overshoot to damage the load coupled to the output. The energy stored in the energy storage element may be transferred to a battery and therefore the battery may provide a supply voltage.

According to a third embodiment of the present invention, an overshoot suppression circuit for a VRM comprises an inductor coupled between a switch and an output of the VRM, and a voltage detector for detecting an output voltage at the output. In a load transient, the voltage detector turns on the switch to charge the inductor from the output when the output voltage is higher than a threshold, and thereby the output voltage will not overshoot to damage the load coupled to the output. The energy stored in the inductor may be transferred to a battery and therefore the battery may provide a supply voltage.

According to a fourth embodiment of the present invention, an overshoot suppression circuit for a VRM comprises a switch coupled to an output of the VRM and a voltage detector for detecting an output voltage at the output. In a load transient, the voltage detector turns on the switch to release energy from the output when the output voltage is higher than a threshold, and thereby the output voltage will not overshoot to damage the load coupled to the output. To avoid conflict between the overshoot suppression circuit and the PWM loop in the VRM, a second switch is further coupled to an output of the voltage detector, and a controller is used to switch the second switch such that the voltage detector may turn on the first switch to release energy only when the load changes from heavy to light.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
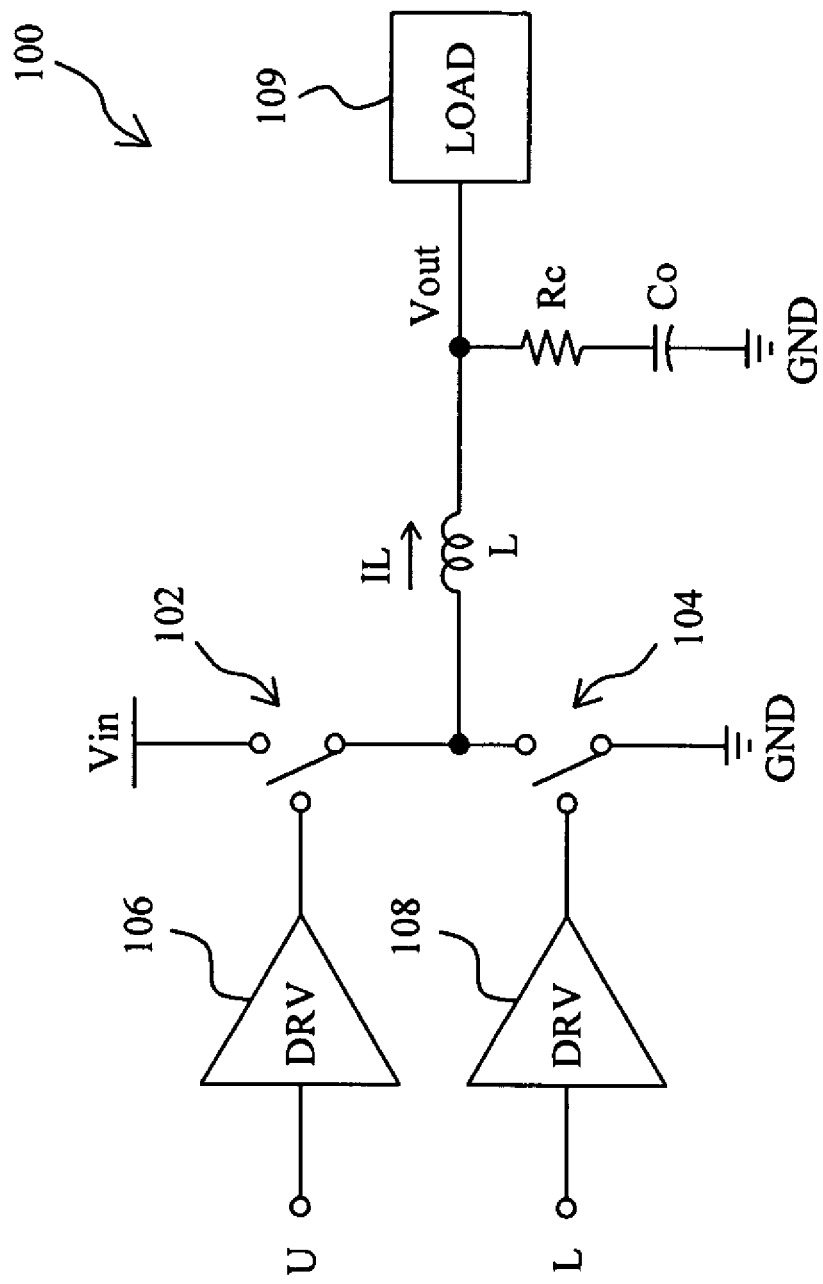
FIG. 1 shows a circuit diagram of a typical buck PWM output stage of a VRM.
Figure 2:
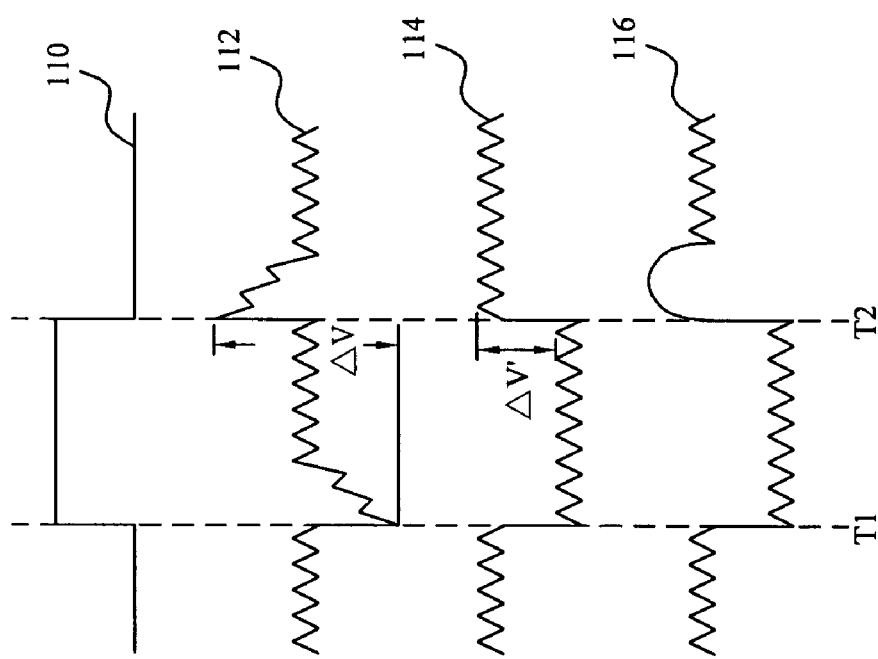
FIG. 2 shows an ideal loading release in VRM condition and real output voltage in a load transient.
Figure 3:
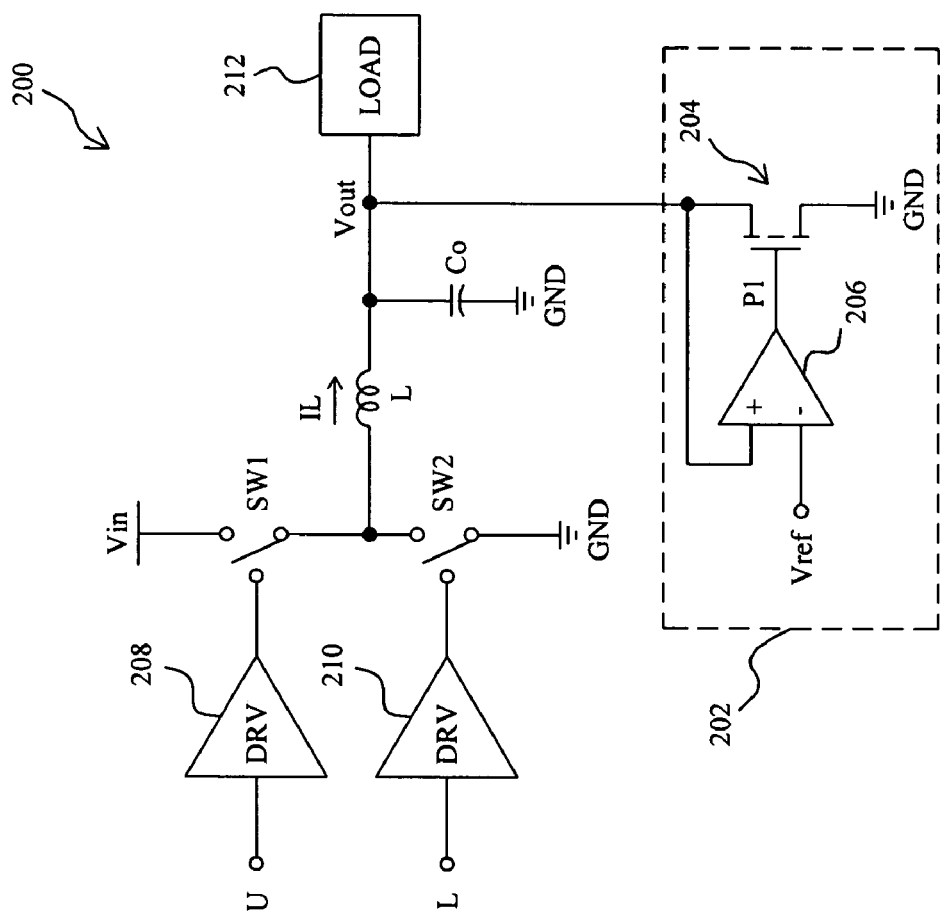
FIG. 3 shows a circuit diagram of a first embodiment according to the present invention.
Figure 4:
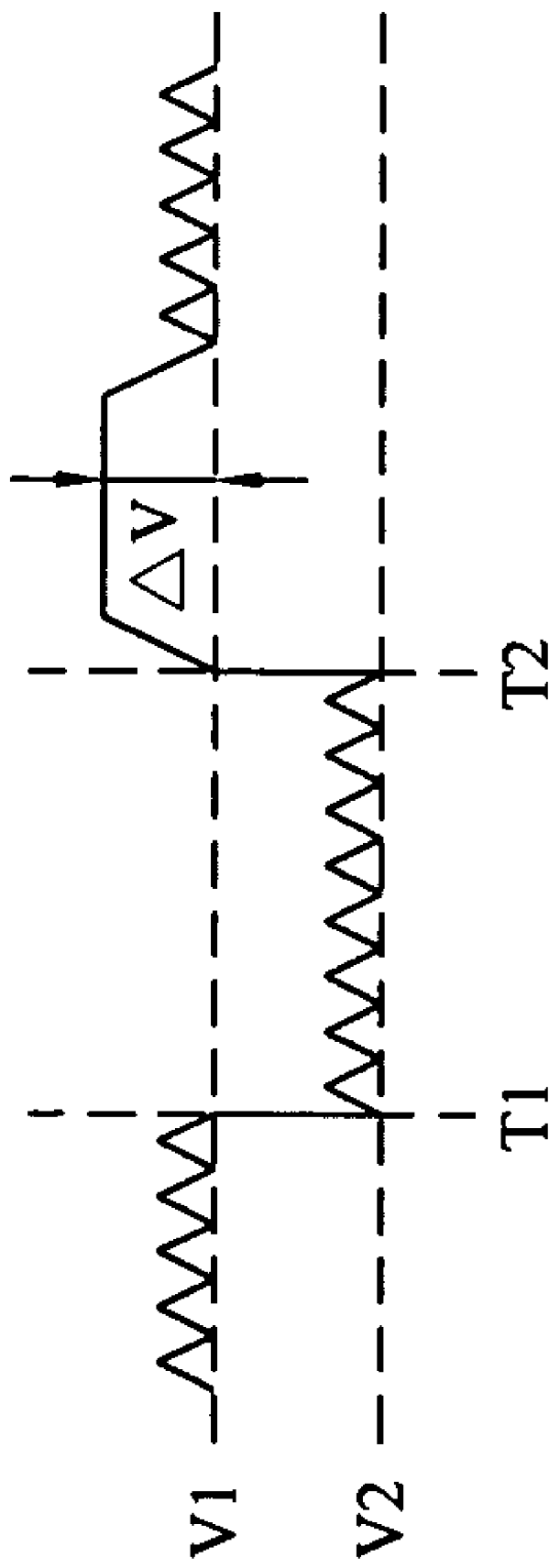
FIG. 4 shows a waveform of the output voltage of the VRM shown in FIG. 3 in a load transient.

FIG. 3 shows a circuit diagram of a first embodiment according to the present invention. In a buck PWM output stage of a VRM 200, signals U and L are used through drivers 208 and 210 to switch a pair of switches SW1 and SW2 coupled between an input voltage Vin and ground GND to produce an inductor current IL flowing through an inductor L to charge an output capacitor Co to produce an output voltage Vout to supply for a load 212. An overshoot suppression circuit 202 according to the present invention is coupled to the output Vout of the VRM 200, which comprises a transistor 204 to serve as a switch coupled between the output Vout of the VRM 200 and ground GND, and an operational amplifier 206 to serve as a voltage detector for detecting the output voltage Vout of the VRM 200. The operational amplifier 206 compares the output voltage Vout with a reference Vref to produce a signal P1 to switch the transistor 204. The transistor 204 is normally off, and is turned on by the signal P1 when the output voltage Vout is higher than the reference Vref. FIG. 4 shows a waveform of the output voltage Vout of the VRM 200 in a load transient. Referring to FIGS. 3 and 4, when the load 212 to the VRM 200 changes from light to heavy at time T1, the output voltage Vout drops down rapidly from level V1 to level V2 and then is maintained at the level V2. Until the load 212 changes from heavy to light at time T2, the output voltage Vout recovers instantly to the original level V1. If the output capacitor Co is not large enough to absorb energy release from the inductor L, the output voltage Vout will exceed the level V1 and may produce overshoot. Once the output voltage Vout exceeds the reference Vref provided for the operational amplifier 206, the operational amplifier 206 turns on the transistor 204 by its output P1 and thereby energy is released from the output Vout of the VRM 200 to ground GND, pulling down the output voltage Vout. As such, the output voltage Vout will be regulated to Vref as loading release. Until the output voltage Vout decreases to the level of the reference Vref or lower, the operational amplifier 206 turns off the transistor 204, so as to stop to release energy from the output Vout of the VRM 200 to ground GND. To avoid conflict between the overshoot suppression circuit 202 and the PWM loop in the VRM 200, the reference Vref is not set as $$Vref=V1, \quad [EQ-1]$$

but over the level V1 with an offset $\Delta V$, such that $$Vref=V1+\Delta V, \quad [EQ-2]$$

where $\Delta V$ is larger than the ripple of the output voltage Vout at steady state.

Figure 5:
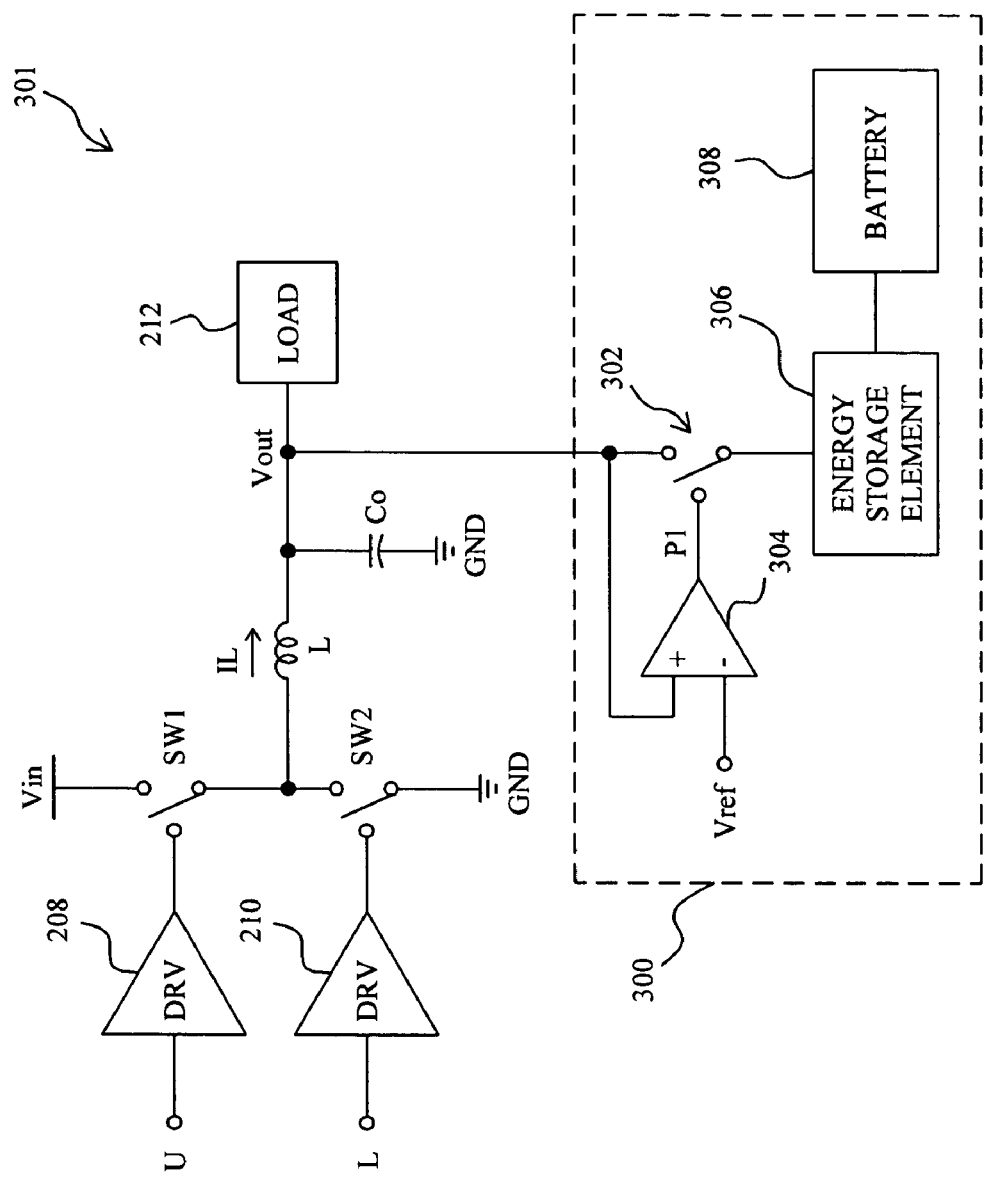
FIG. 5 shows a circuit diagram of a second embodiment according to the present invention.

FIG. 5 shows a circuit diagram of a second embodiment according to the present invention, which has a buck PWM output stage the same as that of the VRM 200 shown in FIG. 3. However, hereof an overshoot suppression circuit 300 according to the present invention comprises a switch 302 coupled between the output Vout of the VRM 301 and an energy storage element 306, and an operational amplifier 304 to serve as a voltage detector for detecting the output voltage Vout of the VRM 301. The operational amplifier 304 compares the output voltage Vout with a reference Vref to produce a signal P1 to switch the switch 302. The switch 302 is normally off, and is turned on by the signal P1 when the output voltage Vout is higher than the reference Vref. When the load 212 to the VRM 301 changes from heavy to light, if the output capacitor Co is not large enough to absorb energy release from the inductor L, the output voltage Vout will exceed the reference Vref, causing the operational amplifier 304 to turn on the switch 302 by its output P1. Once the switch 302 turns on, energy is injected from the inductor L through the output Vout of the VRM 301 to the energy storage element 306, causing the output voltage Vout decreasing. Until the output voltage Vout decreases to the level of the reference Vref or lower, the operational amplifier 304 turns off the switch 302 to stop to inject energy to the energy storage element 306. The reference Vref may be set as in the equation EQ-2. A battery 308 is further coupled to the energy storage element 306, and the energy stored in the energy storage element 306 may be transferred to the battery 308 to produce a supply voltage to provide for other devices, thereby no additional energy loss in this system.

Figure 6:
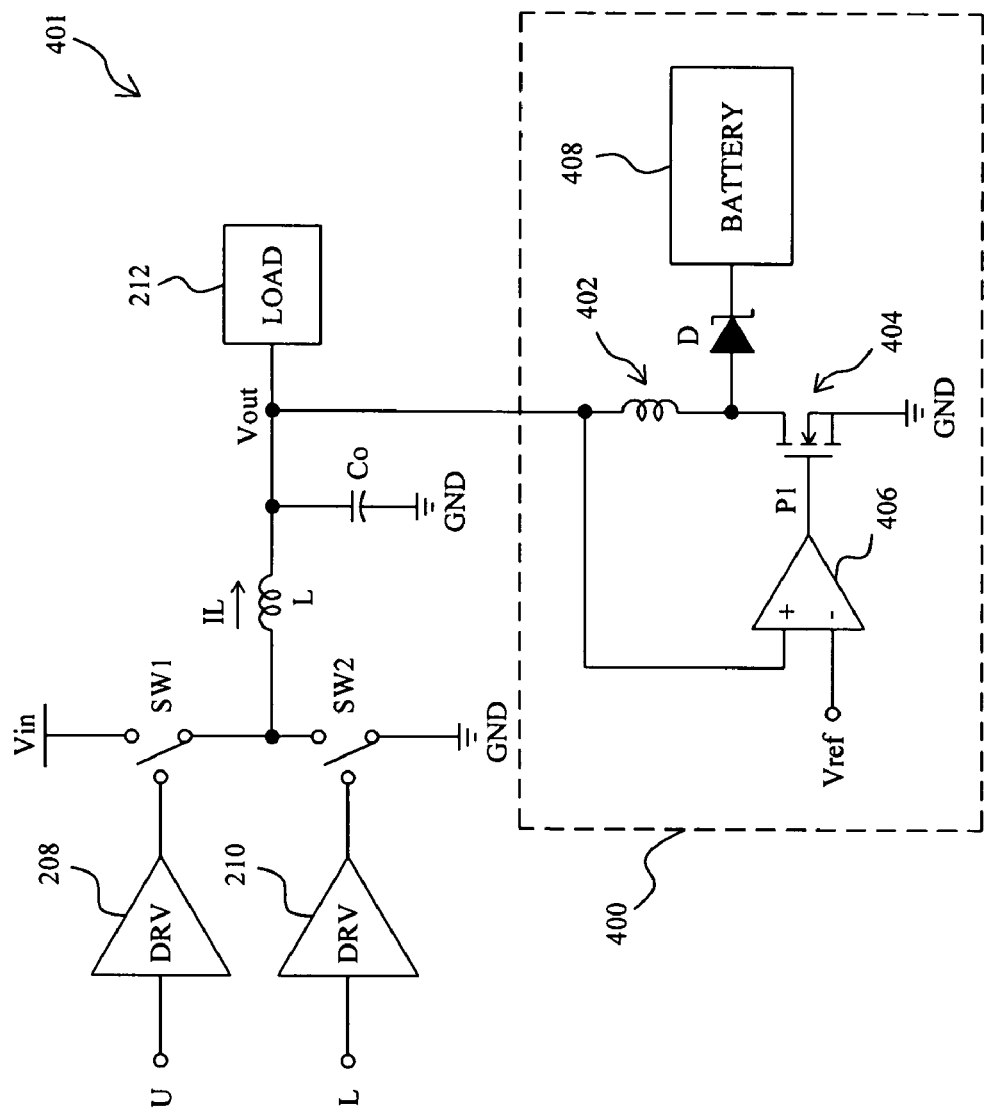
FIG. 6 shows a circuit diagram of a third embodiment according to the present invention.

FIG. 6 shows a circuit diagram of a third embodiment according to the present invention, which has a buck PWM output stage the same as that of the VRM 200 shown in FIG. 3. However, an overshoot suppression circuit 400 for the VRM 401 comprises an inductor 402 and a transistor 404 coupled between the output Vout of the VRM 401 and ground GND, an operational amplifier 406 to serve as a voltage detector for detecting the output voltage Vout of the VRM 401, and a diode D coupled between the inductor 402 and a battery 408. The operational amplifier 406 compares the output voltage Vout with a reference Vref to produce a signal P1 to switch the transistor 404. The transistor 404 is normally off, and is turned on by the signal P1 when the output voltage Vout is higher than the reference Vref in a load transient. When the load 212 to the VRM 401 changes from heavy to light, if the output capacitor Co is not large enough to absorb energy released from the inductor L, the output voltage Vout will exceed the reference Vref, causing the operational amplifier 406 to turn on the transistor 404 by its output P1. After the transistor 404 turns on, the inductor 402 is charged by the energy released from the inductor L, causing the output voltage Vout decreasing. Until the output voltage Vout decreases to the level of the reference Vref or lower, the operational amplifier 406 turns off the transistor 404, and the most additional energy resulted from loading release is transferred from the inductor 402 to the battery 408 through the diode D. The battery 408 may provide a supply voltage for other devices, thereby no additional energy loss in this system.

Figure 7:
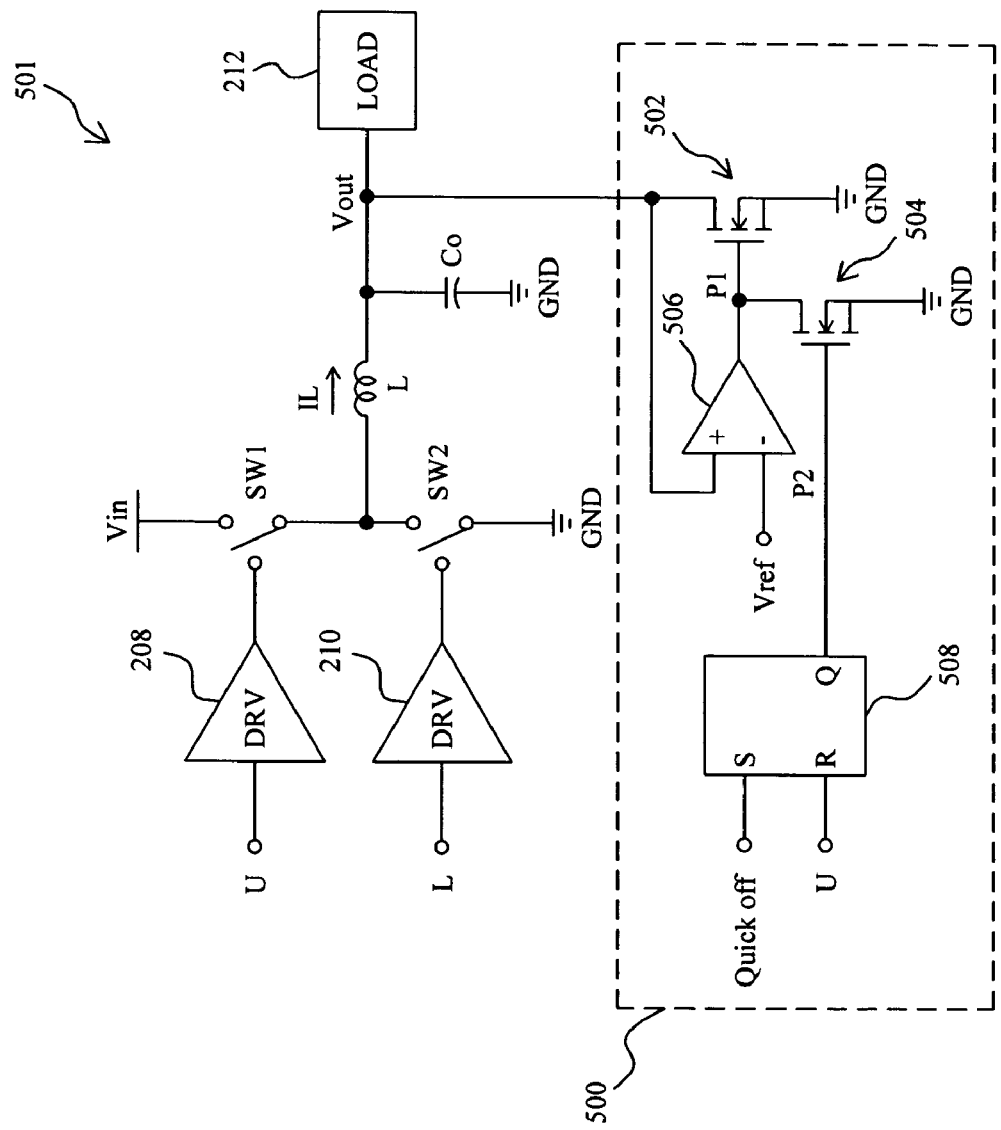
FIG. 7 shows a circuit diagram of a fourth embodiment according to the present invention.

FIG. 7 shows a circuit diagram of a fourth embodiment according to the present invention, which has a buck PWM output stage the same as that of the VRM 200 shown in FIG. 3, and an overshoot suppression circuit 500 coupled to the output Vout of the VRM 501. In the overshoot suppression circuit 500, a transistor 502 is coupled between the output Vout of the VRM 501 and ground GND to serve as a switch, and an operational amplifier 506 serves as a voltage detector for detecting the output voltage Vout of the VRM 501. The operational amplifier 506 compares the output voltage Vout with a reference Vref to produce a signal P1 to switch the transistor 502. The transistor 502 is normally off, and is turned on by the signal P1 when the output voltage Vout is higher than the reference Vref in a load transient. When the load 212 to the VRM 501 changes from heavy to light, if the output capacitor Co is not large enough to absorb energy released from the inductor L, the output voltage Vout will exceed the reference Vref, causing the operational amplifier 506 to pull high its output P1. If the transistor 502 turns on, energy is released from the output Vout of the VRM 501 to ground GND, causing the output voltage Vout decreasing. Until the output voltage Vout decreases to the level of the reference Vref or lower, the operational amplifier 506 pulls down its output P1, and the transistor 502 will not allow releasing energy from the output Vout of the VRM 501 to ground GND.

Figure 8:
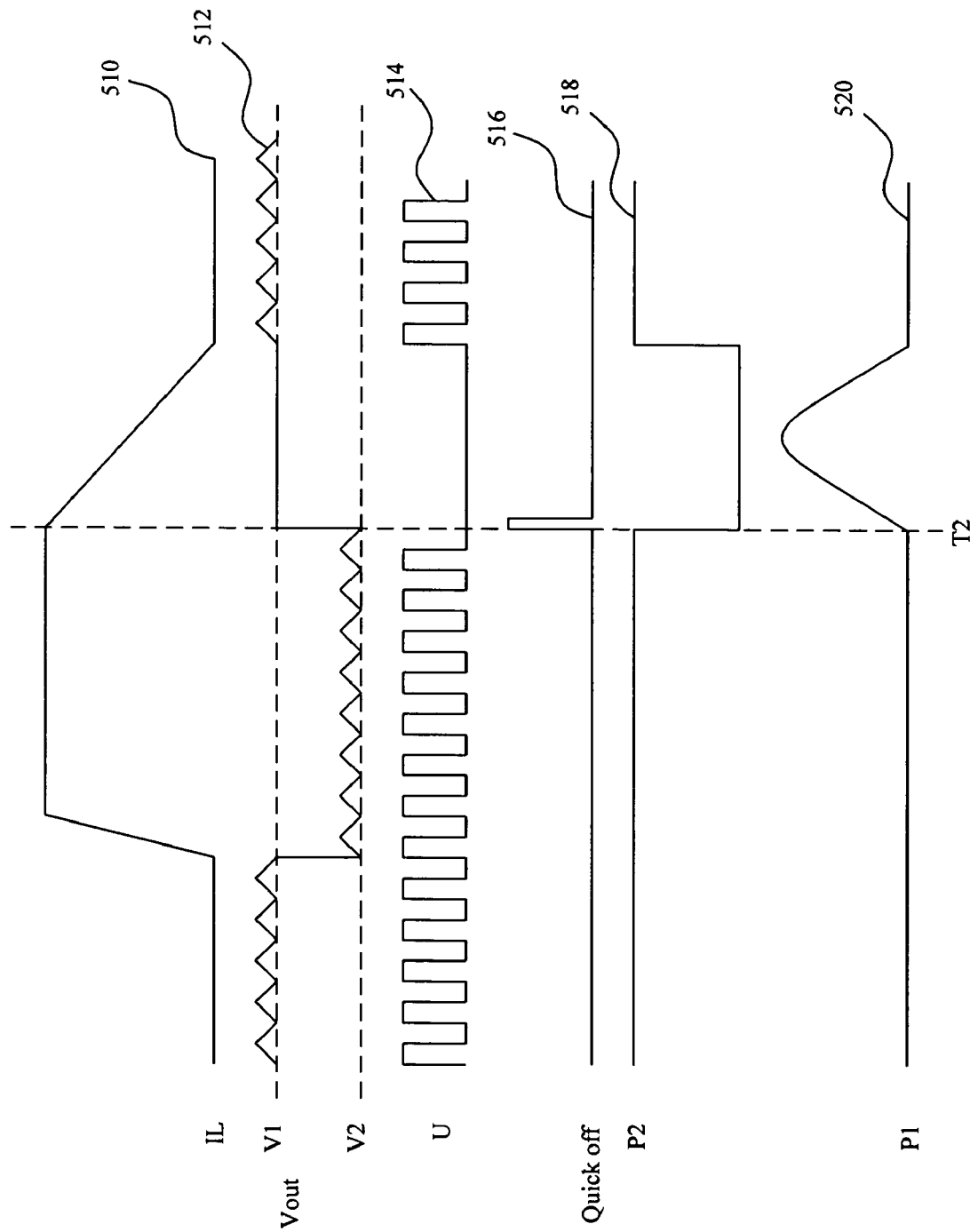
FIG. 8 shows waveforms of various signals in the circuit shown in FIG. 7.

In this embodiment, the reference Vref may be set as indicated in the equation EQ-2. Moreover, to avoid conflict between the overshoot suppression circuit 500 and the PWM loop in the VRM 501, the overshoot suppression circuit 500 further comprises a transistor 504 coupled between the output P1 of the operational amplifier 506 and ground GND to serve as a switch, and a flip-flop 508 serving as a controller to switch the transistor 504. The flip-flop 508 has its set input S coupled with a loading release signal Quick off, its reset input R coupled with the signal U, and its output Q coupled to the gate P2 of the transistor 504, and determines a switch period for the transistor 504. FIG. 8 shows various signals in this circuit 501, in which waveform 510 represents the inductor current IL, waveform 512 represents the output voltage Vout of the VRM 501, waveform 514 represents the signal U to switch the high side switch SW1, waveform 516 represents the loading release signal Quick off, waveform 518 represents the output P2 of the flip-flop 508, and waveform 520 represents the output P1 of the operational amplifier 506. Referring to FIGS. 7 and 8, as loading release, as shown by the waveform 516, the loading release signal Quick off will set the flip-flop 508 to low, and thus the transistor 504 is turned off, by which the operational amplifier 506 is allowed to normally operate. When the output voltage Vout of the VRM exceeds the reference Vref, the operational amplifier 506 will turn on the transistor 502 by its output P1. During the transistor 502 is on, as shown by the waveforms 510 and 512, the inductor current IL decreases and the output voltage Vout is regulated at the level V1. As loading lower to steady state value, the PWM loop in the VRM 501 will start to work and the signal U will turn on to reset the flip-flop 508, as shown by the waveform 514. Then the switch period of the transistor 504 is ended, and the operational amplifier 506 is closed by grounding its output P1 by the signal output P2. As shown by the waveform 518, only the signal P2 is low, the operational amplifier 506 is allowed to work normally, and the signal P1 may start to pull high to regulate the output voltage Vout to Vref, as shown by the waveform 520. In other words, unless the load 212 to the VRM 501 changes from heavy to light as shown at time T2, the overshoot suppression circuit 500 may not be functioning to release energy from the output Vout of the VRM 501 to ground GND, since the output P1 of the operational amplifier 506 is grounded by the transistor 504.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An overshoot suppression circuit comprising:
   an energy storage element for injecting energy thereto;
   a switch connected between the energy storage element and an output of a voltage regulation module; and
   a voltage detector having a first input coupled to the output of the voltage regulation module for detecting an output voltage at the output, a second input coupled to a threshold voltage reference and an output of the voltage detector coupled to the switch to thereby turn on the switch when the output voltage is higher than the threshold voltage reference, wherein the energy storage element increases a load on the output of the voltage regulation module when the switch is turned on to thereby limit an overshoot of the output voltage responsive to a transient change in loading of the voltage regulation module, the energy storage element thereby storing energy responsive to said overshoot of the output voltage exceeding the threshold voltage reference.

2. The circuit of claim 1, wherein the voltage detector comprises an operational amplifier for comparing the output voltage with the threshold voltage reference to turn on the switch.

3. An overshoot suppression circuit comprising:
   an inductor having one terminal coupled to an output of a voltage regulation module;
   a switch coupled between an opposing terminal of the inductor and a reference potential of the output of the voltage regulation module for switching the inductor to be charged;
   a voltage detector having a first input coupled to the output of the voltage regulation module for detecting an output voltage at the output, a second input coupled to a threshold voltage reference and an output of the voltage detector coupled to the switch to thereby turn on the switch when the output voltage is higher than the threshold voltage reference; and
   a battery coupled to the inductor through a diode for charging the battery when the switch has turned off after having been turned on.

4. The circuit of claim 3, wherein the voltage detector comprises an operational amplifier for comparing the output voltage with the threshold voltage reference to turn on the switch.

5. An overshoot suppression circuit comprising:
   a first switch coupled between an output of a voltage regulation module and a reference potential of the output of the voltage regulation module to release energy from the output;
   a voltage detector having a first input coupled to the output of the voltage regulation module for detecting an output voltage at the output, a second input coupled to a threshold voltage reference and an output of the voltage detector coupled to the first switch to thereby turn on the first switch when the output voltage is higher than the threshold voltage reference;

a second switch coupled between the output of the voltage detector and the reference potential of the output of the voltage regulation module for the voltage detector to be operative to turn on the first switch during a switch period; and a controller for switching the second switch.

6. The circuit of claim 5, wherein the voltage detector comprises an operational amplifier for comparing the output voltage with the threshold voltage reference to turn on the first switch.

7. The circuit of claim 5, wherein the controller comprises a flip-flop responsive to two signals determining the switch period for switching the second switch.

8. An overshoot suppression circuit comprising:

an energy storage element for injecting energy thereto;

a switch connected between the energy storage element and an output of a voltage regulation module;

a battery coupled to the energy storage element, the battery being charged by the energy stored therein responsive to the switch being turned on; and a voltage detector having a first input coupled to the output of the voltage regulation module for detecting an output voltage at the output, a second input coupled to a threshold voltage reference and an output of the voltage detector coupled to the switch to thereby turn on the switch when the output voltage is higher than the threshold voltage reference, wherein the energy storage element increases a load on the output of the voltage regulation module when the switch is turned on to thereby limit an overshoot of the output voltage responsive to a transient change in loading of the voltage regulation module.

* * * * *